United States Patent Office 3,375,233
Patented Mar. 26, 1968

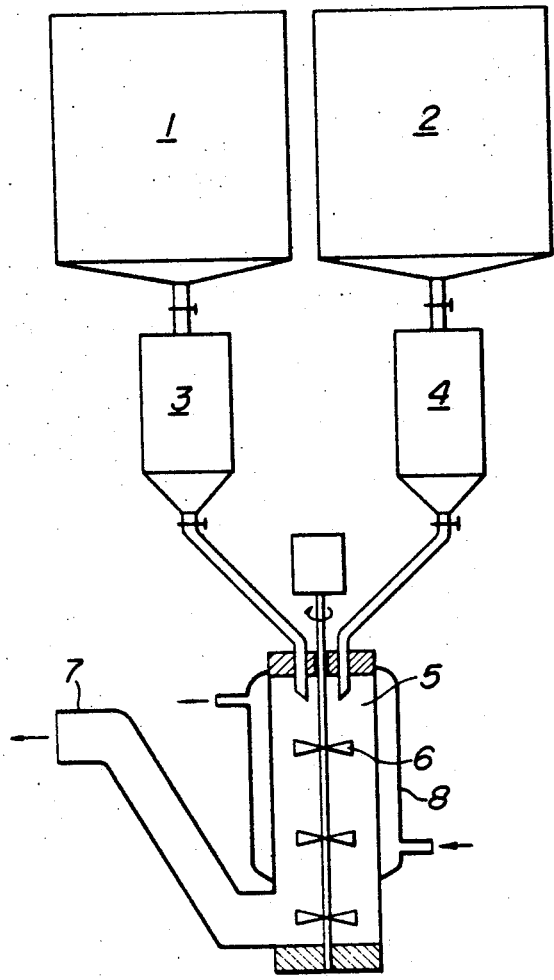

3,375,233
NOVEL HIGHLY POLYMERIZED POLYAMINE SULFONE AND METHOD FOR PRODUCING THE SAME
Susumu Harada and Masamichi Katayama, Fukushima-ken, Japan, assignors to Nitto Boseki Co., Ltd., Gonome, Fukushima-shi, Japan, a corporation of Japan
Filed May 21, 1965, Ser. No. 457,728
Claims priority, application Japan, May 25, 1964, 39/29,100
13 Claims. (Cl. 260—79.3)

This invention relates to a novel highly polymerized polyamine sulfone and methods for producing the same. It has been well known that a compound containing various kinds of double bond and sulfur dioxide produce a polysulfone by copolymerization (e.g. High Polymers XIII "polyethers" Part III. Interscience Publishers, New York, p. 225–270). However no polysulfone copolymers containing a basic nitrogen atom have been heretofore known. The basic nitrogen atom referred to is defined as that included in a primary-, secondary-, tertiary-amine or a quaternary ammonium compound. The exact reason that such a basic-nitrogen containing compound has not been known is not clear, but the principal reason is believed to lie in that a basic-nitrogen containing compound at the state of free amine, reacts with sulfur dioxide to produce an addition compound which prevents the unsaturated amine compound from copolymerizing with sulfur dioxide and thus high polymers cannot be produced.

In accordance with the present invention there is now provided a high molecular polyamine sulfone containing a basic nitrogen atom from an inorganic-, organic-salt or a quaternary ammonium salt of unsaturated amine compound containing at least two allyl ($CH_2=CH-CH_2-$) or methallyl

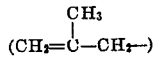

double bonds and at least one basic nitrogen atom and various methods for producing the same hereinafter described. Namely the present invention consists in a novel polyamine sulfone containing more than ⅓ mol $-SO_2-$ bond per mol of monomeric amine unit and methods for producing the same comprising subjecting an inorganic-, organic-salt or a quaternary ammonium salt of unsaturated amine compound containing at least two allyl or methallyl double bonds and at least one basic nitrogen atom and sulfur dioxide to copolymerization.

Unsaturated amine compounds for use in the present invention extend over many kinds of compound, but one group of them is represented by a general Formula I.

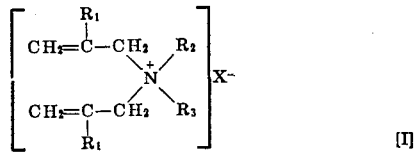

wherein $R_1$ is hydrogen atom or methyl radical, $R_2$ and $R_3$ are hydrogen atom, allyl radical ($CH_2=CH-CH-$), methallyl radical

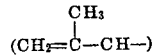

an unbranched or branched alkyl radical having 1 to 18 carbon atoms, phenyl radical, benzyl radical, cyclohexyl radical, phenethyl radical, β-hydroxyethyl radical, β-sulfoethyl radical, β-carboxyethyl radical, carboxymethyl radical or the like and X is Cl, Br, I, $HSO_4^-$, $HSO_3^-$, HCOO, or $CH_3COO$.

Representative unsaturated amine compounds represented by the general Formula I which can be employed in the present invention include:

(a) Hydrochloride, hydrobromide, hydroiodide, sulfate, sulfide, formate, or acetate of diallyl or dimethylallyl amine derivative such as diallylamine, N-methyldiallylamine, N-ethyldiallylamine, N-n-propyl-diallylamine, N-isopropyldiallylamine, N-n-butyldiallylamine N-n-amyldiallylamine, N-hexyldiallylamine, N-lauryldiallylamine, N-(β-cyanoethyl)-diallylamine, N-(β-hydroxyethyl)-diallylamine, N - (β - carboxyethyl) - diallylamine, N - phenyldiallylamine, (N,N - diallylaniline), N,N - diallylbenzylamine, etc., (b) Hydrochloride, hydrobromide, hydroiodide, sulfate, sulfite, formate, or acetate of tertiary amine containing 3 unsaturated bonds such as triallylamine, trimethallylamine, allyldimethallylamine or diallylmethallylamine, quaternary ammonium salts represented by (c–1) and (c–2) i.e. (hereinafter bromide and iodide corresponding chloride will be omitted together with omission of methallyl compound corresponding allyl compound), (c–1) Dimethyldiallyl ammonium chloride, diethyldiallyl ammonium chloride, di-n-propyldiallyl ammonium chloride, methylethyldiallyl ammonium chloride, methylpropyldiallyl ammonium chloride, methyl(β-cyano)ethyldiallyl ammonium chloride, ethyl(β-hydroxy)ethyldiallyl ammonium chloride, methylbutyldiallyl ammonium chloride, methylbenzyldiallyl ammonium chloride, (c–2) Methyltriallyl ammonium chloride, ethyltriallyl ammonium chloride, propyltriallyl ammonium chloride, butyltriallyl ammonium chloride, (β-cyano)ethyltriallyl ammonium chloride, (β-hydroxy)ethyltriallyl ammonium chloride, benzyltriallyl ammonium chloride, n-hexyltriallyl ammonium chloride, tetraallyl ammonium chloride.

Further representative unsaturated amine compounds which are not represented by the general Formula I include:

(d) Diallylpiperidinium chloride, diallylmorpholinium chloride, (e) Hydrochloride, hydrobromide, hydroiodide, sulfate, sulfite, formate, acetate or quaternary ammonium salt of di-, tri- or tetra-allyl derivatives of diamine such as ethylene diamine, propylene diamine, hexamethylene diamine, piperazine, etc.

The method for copolymerizing an unsaturated compound containing basic nitrogen and sulfur dioxide in the present invention will now be given in general.

Monomeric unsaturated amines for use in the present invention are all solid. Those having small carbon numbers are generally well soluble in liquid sulfur dioxide but those having large carbon numbers are difficultly soluble. However in every case, the radical copolymerization can be carried out in an excess of liquid sulfur dioxide in the presence of a suitable catalyst e.g. cumene hydroperoxide. However the polymerization in the medium of liquid sulfur dioxide needs a low temperature lower than −30° C. and involves many difficult problems in the treatment of the excess sulfur dioxide after polymerization and hence it is not suitable for commercial operation. Accordingly solvents capable of dissolving both the salt of monomeric amine and sulfur dioxide e.g. water, methyl alcohol, ethyl alcohol, dimethyl sulfoxide, dimethyl formamide, dimethyl acetamide, dimethyl sulfone, tetramethylene sulfone, etc. can be used in general in the present invention as a solvent or diluent. Further such a solvent as acetone, methyl ethyl ketone or the like does not dissolve by itself the monomeric amine for use in the present invention but since it dissolves some monomeric amines in the coexistence with sulfur dioxide, it can be used as a diluent in the polymerization. If such a solvent or diluent is used, the polymerization can be carried out at room temperature and at atmospheric pressure and there is no need of using an excess of sulfur dioxide, hence such a polymerization is very convenient.

Polyamine sulfones formed by the copolymerization are, in general, insoluble in alcohol, or ketone and they soon precipitate with the commencement of polymerization. When dimethyl sulfoxide, dimethyl sulfone, dimethyl formamide, dimethyl acetamide or the like is used, the state of reaction system varies according to the kind of monomer, e.g. in one case the polymerization proceeds in the homogeneous phase until the end, in another case the whole system gels during the course of polymerization and in a further case resulting polyamine sulfone is separated out as precipitate.

When water is used, the polymerization proceeds, in general in the homogeneous phase until the end but when a monomeric amine containing 3 or 4 double bonds is used, the whole system frequently gels. Monomeric amine for use in the present invention is preferably employed at the isolated state as crystal but when it is extremely difficult to isolate the monomer as is frequently the case with carboxylic acid salt of amine, it is possible to add such a free amine and an acid to the polymerization system to form a salt therein and complete the polymerization.

Polymerization catalysts include organic peroxides such as tert.-butylhydroperoxide, cumene hydroperoxide or the like, aliphatic azo compounds such as $\alpha,\alpha'$-azo-bis-isobutyronitrile or the like, inorganic peroxides such as ammonium persulfate, potassium persulfate or the like and nitrate such as ammonium nitrate, potassium nitrate or the like. In some cases, the polymerization may be initiated by oxygen or air alone. Radioactive rays, ultraviolet rays or visible rays also initiate the polymerization. It is believed that the polymerization proceeds all with the radical mechanism. When substances known as inhibitors for the radical polymerization e.g. hydroquinone are added to the polymerization system, the polymerization terminates in all the cases where the above-mentioned catalysts are used. Initiators for use in the ionic polymerization cannot be used in the present invention.

The polymerization temperature varies depending upon the combination of catalyst and solvent but it is in the range from $-100°$ C. to $70°$ C. preferably from $-10°$ C. to $50°$ C.

The polymerization time is less than 100 hours.

From monomeric amines containing two allyl or methallyl radicals jointed to the same nitrogen atom, (e.g. compounds belonging to (a), (c-1) and (d) from among those illustrated above), polysulfones having high polymerization degrees and soluble in solvents are readily produced. In this instance it is preferable to use such a solvent as alcohol or acetone and such a catalyst as organic hydroperoxide. Alternatively it is preferable to carry out the polymerization at a temperature of $0°$ to $30°$ C. with stirring using dimethyl sulfoxide, dimethyl formamide or the like as a solvent, and persulfate as a catalyst.

The greater the molar ratio of monomeric amine to sulfur dioxide in the monomeric mixture is and the higher the concentration of monomer is, the higher the molecular weight of resulting polyamine sulfone is.

The amount of catalyst used does not give so significant influence upon the molecular weight of polyamine sulfone.

From the fact that polyamine sulfones obtained from such diallylamine derivatives contains always $-SO_2-$ units molar equivalent to monomeric amine units irrespective of the compositions of charged monomer and hardly contains double bond, it is believed that an alternative cyclo-copolymerization occurs in this instance. Hence the structure of resulting polyamine sulfone in such instance can be represented by a general Formula II.

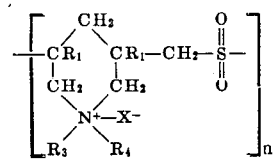

This type of polyamine sulfones is thermally stable, and shows relatively high resistance to alkali. Hence it is the most important group of the compounds of the present invention in the practical view point.

From monomeric amines containing 3 or 4 double bonds in a molecule (e.g. compounds belonging to (b), (c-2), and a part of (e) from among those illustrated above) solvent-soluble substances or solvent-insoluble substances are obtained, depending upon the polymerization method. For example when the polymerization is carried out in a medium of methanol or acetone using tert.-butylhydroperoxide as a catalyst, a solvent-soluble polyamine sulfone is generally obtained. On the other hand when the polymerization is carried out in a medium of water, dimethyl sulfoxide, dimethyl formamide or the like, a solvent-insoluble polyamine sulfone is generally obtained. In this instance it is not preferable to use sulfur dioxide in a smaller amount relative to monomeric amine since homopolymer of monomeric amine is produced and mixed in the product. Accordingly it is preferable to have the molar percentage of sulfur dioxide in the monomer mixture more than 35 percent.

The structure of polyamine sulfones obtained from monomeric amines containing 3 to 4 double bonds is not clear but it is considered to be fairly complicated. At any rate in all cases they contain $-SO_2-$ units in a molar ratio of at least 1/3 per monomeric amine in their main chain.

Further the present invention includes polyamine sulfones obtained by the multi-component copolymerization between any two or more than any two of the above-mentioned monomeric unsaturated amines and sulfur dioxide and methods for producing the same.

In general polyamine sulfones obtained in the present invention are white powder, amorphous and brittle and most of them soluble in cold or hot water. Many of them are insoluble in organic solvents but there are some which are soluble in dimethyl sulfoxide, dimethyl sulfone and dimethyl formamide. There are also those soluble in alcohol such as the polyamine sulfone obtained from diethyl diallyl ammonium chloride.

It is a well known fact that high molecular compounds containing basic nitrogen, without exception, turn yellow when exposed in the air for a long time even if they are colorless just after being produced. Surprisingly enough, the polyamine sulfones hardly turn yellow in spite of the inclusion of basic nitrogen atom in their molecules. In fact the polyamine sulfones produced from sufficiently pure raw materials are colorless and are not discolored at all even when left to stand in the air more than 6 months. However the polyamine sulfones derived from hydroiodide or quaternary ammonium iodide of the above-mentioned monomeric amine are frequently discolored because of the iodine liberated during the polymerization.

The use of carboxylic acids tends to lower the polymerization yield. Sulfates or sulfites are difficult to isolate in the production. In this regard what is most recommendable among monomeric amines for use in the present invention is a hydrochloride or a quaternary ammonium chloride type compound of monomeric amine.

The polyamine sulfones produced in the present invention have various kinds of use as shown below: basic ion exchange resins, water soluble paints, adhesives, resinous finishing agent for fibers, starching agents for fibers, starching agents for printing, coating agent for paper, blending polymers for improving dyeability of synthetic fibers or regenerated cellulose fibers, improving agents for fastness of dyed substances for direct or acid dyestuffs, striping agents for dyestuff, protecting agents for colloid, high molecular cationic surfactants, crack preventive agents for concrete or mortar, cohesive agents for glass fibers, modifier for use in the manufacture of viscose fibers, flocculant and the like.

The present invention may be more fully understood from the following examples which are offered by way of illustration and not by way of limitation.

In Examples 1 to 10, various methods for producing polyamine sulfones in accordance with the present invention will be given, using dimethyl diallyl ammonium chloride.

Example 1

At first a method for producing dimethyldiallyl ammonium chloride will be given.

9.0 kg. of 40 percent aqueous solution of dimethylamine was charged in a 20 l. 5-necked flask equipped with a stirrer, 2 dropping funnels, a thermometer and a reflux condenser, and 1.5 kg. of allyl chloride was dropped while the temperature was maintained at 30° C. by cooling with stirring. Then the dropping of 6.4 kg. of 50 percent aqueous solution of caustic soda was started and concurrently 4.6 kg. of allyl chloride was dropped in such a way as the both dropping ended at the same time. The temperature was maintained at lower than 30° C. during the time of dropping. Then 800 g. of solid caustic soda was added and the reaction was carried out by heating at a temperature of 40° C. for 1 hour. After the reaction, the upper layer was separated, dried over caustic soda pellets and distilled whereby 5 kg. of dimethylallylamine was obtained from the fraction of 61° C. to 62° C. 4.25 kg. of resulting dimethylallylamine and 3.82 kg. of freshly distilled allyl chloride was added to 8 kg. of acetone and allowed to react while the temperature was maintained at 40° C. by cooling, by which dimethyldiallyl ammonium chloride is crystallized out. After 20 hours, separated crystal was filtered and dried at a temperature of 50° C. under a reduced pressure. Thus 7.8 kg. of dimethyl diallyl ammonium chloride was obtained.

323.5 parts by weight of dimethyldiallyl ammonium chloride were dissolved in dimethyl sulfoxide and further diluted with dimethyl sulfoxide to 1 l. to prepare 2 mol./l. dimethylsulfoxide solution of dimethyldiallyl ammonium chloride. Similarly 2 mol/l. dimethyl sulfoxide solution of sulfur dioxide was prepared. Each definite amount of dimethyl sulfoxide solutions of monomeric amine and sulfur dioxide was charged in a polymerization tube and subjected to still-standing polymerization at various conditions shown in following Table 1. After polymerization, the content (including precipitated polymer) was added to a large amount of methanol, the precipitate was filtered, washed with a large amount of methanol and dried at a temperature of 40° C. under a reduced pressure.

tion spectra of this material, there were seen strong absorptions at 1350 cm.$^{-1}$ and 1140 cm.$^{-1}$ due to —SO$_2$—, but the absorption at 1640 cm.$^{-1}$ due to double bond could not be found. Free double bonds could not be observed also by the test carried out by the contact reduction method.

These polysulfones are soluble in water over the entire range of pH but are insoluble in common organic solvents. As seen from Expt. No. 1–10 in Table 1, only a small amount of polymer was obtained but this homopolymer is soluble in methanol, or dimethylsulfoxide and entirely different from polysulfones obtained in Expt. No. 1–01 to 1–09. From the above-mentioned reason it was believed that the polymers obtained in Expt. No. 1–01 to No. 1–09 were polyamine sulfones (A) produced by the 1:1 cyclocopolymerization of dimethyl diallyl ammonium chloride and sulfur dioxide.

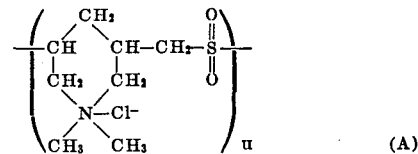
(A)

These polyamine sulfones (A) were white powder and decomposed by heating in the air without melting. The behavior of viscosity of polyamine sulfones (A) in aqueous solution was typically that of polyelectrolyte. The values of $\eta_{inh}$ (inherent viscosity=ln $\eta_{rel}$/C.) as measured in N/10 NaCl aqueous solution at a temperature of 30° C., and at a concentration of 0.5 g./100 ml., in table became smaller with the increased amounts of sulfur dioxide in the monomer mixtures. Accordingly it would be preferable to have the molar ratio of sulfur dioxide in the monomer mixtures smaller so as to obtain in this system a polyamine sulfone (A) having a large molecular weight.

Example 2

2.43 kg. of dimethyldiallyl ammonium chloride prepared in accordance with the method described in Example 1 was charged in a 20 l. 4-necked flask equipped with a stirrer, a thermometer, a dropping funnel, and a reflux condenser and 8 kg. of methanol was added to dissolve it. Then a solution containing 930 g. of sulfur dioxide in 3 kg. methanol was added. While this solution was maintained at a temperature of 20° C. with stirring, 2 kg. of 3 percent methanol solution of tertiary butylhydroperoxide was gradually dropped. The polymerization started immediately and white polymer appeared as precipitate. The polymerization was continued for 3 hours even after dropping of the catalyst solution was finished and then resulting polymer, filtered, washed with methanol, and

TABLE 1

| Expt. No. | SO$_2$ in DMSO Solution, ml. | DMDAAm-Cl in DMSO Solution, ml. | Molar-ratio SO$_2$:DMDAAm-Cl | Catalyst, mmg. | Temp., °C. | Yield, g. | $\eta_{inh}$ | Elementary analysis | | | |
|---|---|---|---|---|---|---|---|---|---|---|---|
| | | | | | | | | S, percent | N, percent | C, percent | H, percent |
| 1-01 | 15 | 5 | 0.03:0.01 | APS 45.6 | 30 | 0.77 | 0.33 | 14.32 | 5.92 | 39.99 | 7.26 |
| 1-02 | 10 | 5 | 0.02:0.01 | APS 45.6 | 30 | 1.03 | 0.51 | 14.10 | 6.01 | 40.77 | 6.87 |
| 1-03 | 5 | 5 | 0.01:0.01 | APS 45.6 | 30 | 1.83 | 0.94 | 14.21 | 5.78 | 41.01 | 7.10 |
| 1-04 | 5 | 10 | 0.01:0.02 | APS 45.6 | 30 | 1.94 | 1.26 | 14.63 | 5.82 | 40.33 | 7.46 |
| 1-05 | 5 | 15 | 0.01:0.03 | APS 45.6 | 30 | 2.06 | 1.52 | 14.92 | 5.85 | 40.65 | 7.16 |
| 1-06 | 5 | 20 | 0.01:0.04 | APS 45.6 | 30 | 2.03 | 1.76 | 14.15 | 5.91 | 41.15 | 7.03 |
| 1-07 | 5 | 5 | 0.01:0.01 | ABN 45.6 | 55 | 0.87 | 0.57 | 14.32 | 5.96 | 41.61 | 7.18 |
| 1-08 | 5 | 10 | 0.01:0.02 | ABN 91.2 | 55 | 1.46 | 0.68 | 14.18 | 6.05 | 40.88 | 7.19 |
| 1-09 | 5 | 20 | 0.01:0.04 | ABN 91.2 | 55 | 1.81 | 0.92 | 13.98 | 6.02 | 41.88 | 7.35 |
| 1-10 | 0 | 20 | | APS 91.2 | 30 | 0.11 | 0.02 | | 8.20 | 56.42 | 9.52 |

DMDAAm-Cl: dimethyldiallyl ammonium chloride; DMSO: dimethyl sulfoxide; APS: ammonium persulfate; ABIN: azo-bis-isobutyronitrile; $\eta_{inh}$: inherent viscosity ln $\eta_{rel}$/C (C=0.5 g./100 ml., N/10 NaCl aq. sol. at 30° C.).

As seen from the data of elementary analysis Table 1, the compositions of polymers were the same, irrespective of molar ratio of dimethyldiallyl ammonium chloride to sulfur dioxide in the monomer mixtures and one mol of dimethyldiallyl ammonium chloride and one mol of sulfur dioxide were copolymerized. In the infrared absorpdried at a temperature of 40° C. under a reduced pressure, afforded 3.11 kg. of yield. This polymer had a content of 14.15 percent by weight of sulfur and the same properties as the polyamine sulfone (A) obtained in Example 1. A $\eta_{inh}$ as measured in N/10 sodium chloride aqueous solution at a temperature of 30° C. was 0.45.

Example 3

0.85 kg. of dimethylallylamine, 0.765 kg. of allylchloride, and 3 kg. of acetone were charged in the same flask as in Example 2. When the reaction was continued for 24 hours at a temperature maintained at lower than 40° C., the crystal of dimethyldiallyl ammonium chloride came to precipitate out. When a solution containing 0.64 kg. of sulfur dioxide in 12 kg. of acetone was added thereto, a homogeneous acetone solution of sulfur dioxide and dimethyldiallyl ammonium chloride was obtained with stirring. Then 1 kg. of 1 percent acetone solution of tert.-butylhydroperoxide was gradually dropped with stirring at a temperature lower than 30° C. The polymerization started immediately and white polymer precipitated. The polymerization was continued for 1 hour even after dropping of the catalyst solution was finished. Resulting polymer, filtered, washed with methanol and dried at a temperature of 40° C. under a reduced pressure afforded 2.18 kg. yield. This polymer contained 14.02 percent by weight of sulfur and was the same material as the polyamine sulfone (A) obtained in Example 1. A $\eta_{inh}$ as measured in N/10 aqueous solution of sodium chloride at a temperature of 30° C. was 0.38.

Example 4

Acetone solution of dimethyldiallyl ammonium chloride and sulfur dioxide was prepared as in Example 3. Air was blown into the solution for one hour with stirring at a velocity of 1 l./min. After about 5 minutes from the start of air blowing, the polymerization started and white polymer precipitated. The stirring was continued for 2 hours at a temperature lower than 30° C. after the completion of blowing. Resulting polymer, filtered, washed with methanol and dried at a temperature of 40° C. under a reduced pressure, afforded 2.01 kg. of yield. This polymer contained 13.96 percent by weight of sulfur and was the same material as the polyamine sulfone (A) obtained in Example 1. A $\eta_{inh}$ is measured in N/10 aqueous solution of sodium chloride was 0.42.

Example 5

1.62 kg. of dimethyldiallyl ammonium chloride was charged in a 5 l., 3-necked flask equipped with a stirrer, a thermometer and a reflux condenser and dissolved by adding 1 kg. of methanol. Then a solution containing 0.32 kg. of sulfur dioxide in 1.2 kg. of methanol was added. After elevating the temperature to 30° C., a solution containing 11 g. of ammonium persulfate in 20 g. of water was added and with stirring a homogeneous solution was obtained. Then the stirring was stopped and the still-standing polymerization was carried out at a temperature of 30°±2° C. for 72 hours. Resulting polymer, filtered, washed with methanol and dried at a temperature of 40° C. under a reduced pressure amounted to 0.95 kg. of yield. This polymer contained 14.25 percent by weight of sulfur and was the same material as the polyamine sulfone (A) obtained in Example 1. The polymer produced in this example had a high molecular weight and a $\eta_{inh}$ (as measured in N/10 aqueous solution of sodium chloride) of 2.8.

Example 6

162 g. of dimethyldiallyl ammonium chloride was dissolved in 140 g. of water in a 1 l., 4 necked flask equipped with a stirrer, a thermometer, a gas blowing pipe and a reflux condenser. 20 g. of sulfur dioxide was blown into this aqueous solution and was dissolved therein. Then a solution containing 1.6 g. of ammonium persulfate in 20 g. of water was added. The polymerization was carried out with further stirring while 40 g. of sulfur dioxide was blown. After 10 minutes from the addition of ammonium persulfate the polymerization started, evolving heat abruptly. After the completion of the blowing of sulfur dioxide, a solution containing 1.6 g. of ammonium persulfate in 60 g. of water was added and the polymerization was continued for another 3 hours at a temperature of 30° C. whereby colorless transparent viscous solution was obtained. When this solution was added to a large amount of methanol, white powdered polymer came to precipitate out. Resulting polymer, filtered washed with methanol and dried at a temperature of 40° C., under a reduced pressure afforded 190 g. of yield. This polymer contained 14.11 percent by weight of sulfur and was the same material as the polyamine sulfone (A) obtained in Example 1. An $\eta_{inh}$ as measured in N/10 aqueous solution of sodium chloride at a temperature of 30° C. was 0.32.

Example 7

Into 80 parts by weight of dimethyl formamide, 6.4 parts by weight of sulfur dioxide were blown and dissolved. 16.2 parts by weight of dimethyldiallyl ammonium chloride and 0.28 part by weight of ammonium persulfate were dissolved in the solution prepared above. White polymer came to precipitate out by the polymerization at a temperature of 30° C. for 20 hours. After polymerization, resulting polymer was filtered washed with a large amount of water and dried at a temperature of 40° C. under a reduced pressure whereby a yield of 19.6 parts by weight was obtained. This polymer contained 14.16 percent by weight of sulfur and was the same material as the polyamine sulfone (A) obtained in Example 1. An $\eta_{inh}$ as measured in $\frac{1}{10}$N aqueous solution of sodium chloride was 0.86.

Example 8

50 parts by weight of liquid sulfur dioxide were charged in a 100 cc. pressure bottle with cooling. Then 10 parts by weight of dimethyldiallyl ammonium chloride were added and dissolved therein. While this solution was maintained at a temperature of −45° C., one part of 70 percent cumene solution of cumene hydroperoxide was added and the temperature was maintained at −40° C. to −50° C. for 20 hours. After polymerization the temperature was elevated to room temperature, an excess of sulfur dioxide was evaporated, methanol was added to wash resulting polymer, which was thereafter filtered and dried under a reduced pressure. A yield of 4.4 parts by weight was obtained. This polymer contained 14.36 percent by weight of sulfur and was confirmed as polyamine sulfone (A). An $\eta_{inh}$ as measured in N/10 aqueous sodium chloride solution was 0.26.

Example 9

6.4 parts by weight of sulfur dioxide was blown and dissolved in 80 parts by weight of tetramethylene sulfone. 16.2 parts by weight of dimethyldiallyl ammonium chloride was dissolved in this solution, 0.2 part by weight of ascaridol was added and subjected to still-standing polymerization at a temperature of 20° C. for 20 hours. Polymer which was separated by dropping the content obtained by the polymerization into a large amount of methanol, was filtered, sufficiently washed with methanol and dried under a reduced pressure. A yield of 21.8 parts by weight was obtained. This polymer contained 14.02 percent by weight of sulfur and was confirmed as polyamine sulfone (A). An $\eta_{inh}$ as measured in N/10 aqueous sodium chloride solution at a temperature of 30° C. was 1.46.

Example 10

A method for producing continuously polyamine sulfone with use of an apparatus indicated in FIGURE 1 will be explained.

64 parts by weight of sulfur dioxide were dissolved in 500 parts of acetone, further 161.7 parts by weight of dimethyldiallyl ammonium chloride were dissolved in the solution prepared above and the whole was diluted to 1000 parts by volume with acetone. A 20 l. acetone solution containing each one mol of sulfur dioxide and dimethyldiallyl ammonium chloride per liter was fed in a tank 1. Then a 20 l. acetone solution containing 4.5 parts by weight of tert.-butylhydroperoxide in 1 l. was fed in a tank 2. Each solutions were dropped in a cylindrical polymerization vessel 5 continuously through individual dropping vessels 3 and 4 at a velocity of 200 ml./min. Two solutions were mixed with a bladed stirrer 6. The polymerization commenced immediately and separated polyamine sulfone was discharged continuously from a outlet 7, filtered and dried. The solution was maintained at a temperature lower than 30° C. during the polymerization time by running cooled water through a jacket 8. The polymerization proceeded almost quantitatively and there was no odor of sulfur dioxide detected.

Polyamine sulfones produced in each method from Examples 1 to 10 showed high resistance to discoloration. Even their powders were heated in the air at a temperature of 110° C. for 3 hours were not discolored in yellow and their aqueous solution stood in the air for 6 months without slightest extent of discoloration. This polyamine sulfone possessed superior qualities for use in finishing agents for improving wash-fastness of products dyed with direct dyestuffs and flocculants.

*Example 11*

In this example, diallyl amine hydrochloride were used together with sulfur dioxide instead of dimethyldiallyl ammonium chloride in each methods of copolymerization from Example 1 to Example 9. Each polymerization conditions and their results are shown in Table II.

*Example 12*

485 g. of diethyldiallyl ammonium chloride was charged in a 10 l. 4-necked flask, equipped with a stirrer, a thermometer, a dropping funnel and a reflux condenser and then 5 kg. of acetone solution containing 160 g. of sulfur dioxide was added to dissolve diethyldiallyl ammonium chloride with stirring. Further 640 g. of 1 percent acetone solution of tert.-butylhydroperoxide was gradually dropped. The polymerization started immediately and white polyamine sulfone came to precipitate out. During the dropping time, the temperature was maintained at 20° to 30° C. The polymerization was continued further until the odor of sulfur dioxide was disappeared even after the completion of dropping. After polymerization, resulting polymer was filtered, washed with a 1:9 mixture (by volume ratio) of methanol and acetone and dried, whereby a yield of 630 g. was obtained. This polyamine sulfone contained 12.21 percent by weight of sulfur and 5.15 percent by weight of nitrogen and its infra red spectra showed strong absorptions at 1350 cm.$^{-1}$ and 1140 cm.$^{-1}$ due to —$SO_2$—. It was soluble in dimethyl sulfoxide, dimethyl formamide or the like and an $\eta_{inh}$ as measured in N/10 aqueous solution of sodium chloride at a temperature of 30° C. was 0.46.

*Example 13*

Acetone solutions of diethyldiallyl ammonium chloride and of sulfur dioxide were prepared as in Example 12

TABLE II

| Expt. No. | $SO_2$ | 1) DAA-HCl | Molar ratio $SO_2$:DAA-HCl | Solvent | Catalyst | Temp., °C. | Time, hrs. | Yield | $\eta_{inh}$ | Polymerization Method |
|---|---|---|---|---|---|---|---|---|---|---|
| 2-01 | 0.64 g | 4.065 g | 0.01:0.03 | DMSO 25 g | APS 22.8 mg | 30 | 20 | 1.95 g | 1.50 | } Correspond to Example 1. |
| 2-02 | 0.64 g | 2.71 g | 0.01:0.02 | DMSO 22g | APS 22.8 mg | 30 | 20 | 1.88 g | 1.23 | |
| 2-03 | 0.64 g | 1.35 g | 0.01:0.01 | DMSO 18 g | APS 22.8 mg | 30 | 20 | 1.56 g | 0.76 | |
| 2-04 | 1.28 g | 1.35 g | 0.02:0.01 | DMSO 22 g | APS 22.8 mg | 30 | 20 | 1.21 g | 0.48 | |
| 2-05 | 1.92 g | 1.35 g | 0.03:0.01 | DMSO 25 g | APS 22.8 mg | 30 | 20 | 0.82 g | 0.27 | |
| 2-06 | 0.64 kg | 1.35 kg | 10:10 | MeOH 8 kg | TBHP 60 g | 20 | 3 | 1.65 kg | 0.31 | } Correspond to Example 2. |
| 2-07 | 0.512 kg | 1.35 kg | 8:10 | MeOH 7.5 kg | TBHP 60 g | 20 | 3 | 1.42 kg | 0.42 | |
| 2-08 | 0.64 kg | 1.35 kg | 10:10 | Acetone 10 kg | TBHP 20 g | 20 | 5 | 1.62 kg | 0.36 | To Example 3. |
| 2-09 | 0.32 kg | 1.35 kg | 5:10 | MeOH 1.7 kg | APS 34 g | 30 | 72 | 0.82 kg | 1.42 | To Example 5. |
| 2-10 | 64 g | 135.5 g | 1:1 | $H_2O$ 200 g | APS 4 g | 30–50 | 10 | 109 g | 0.31 | To Example 6. |
| 2-11 | 6.4 g | 13.5 g | 0.1:0.1 | DMF 80 g | APS 0.2 g | 30 | 20 | 11.2 g | 0.42 | To Example 7. |
| 2-12 | 64 g | 13.5 g | 1:0.1 | $SO_2$ | CHP 1 g | −40~−50 | 20 | 9.2 g | 0.31 | To Example 8. |
| 2-13 | 6.4 g | 13.5 g | 0.1:0.1 | TMSO 80 g | Ascaridol 0.2 g | 20 | 20 | 16.4 g | 0.45 | To Example 9. |

NOTE.—DAA-HCl: diallylamine hydrochloride; DMSO: dimethylsulfoxide; MeOH: methanol; DMF: dimethylformamide; TMSO: tetramethylenesulfone; APS: ammonium persulfate; TBHP: tert-butylhydroperoxide; CHP: cumene hydroperoxide; $\eta_{inh}$: inherent viscosity in $\eta$ rel/C determined in 0.1 N NaCl at 30° C. (C=0.5 g./100 ml.).

The polyamine sulfones obtained in each example contained all 6.90 to 7.30 percent by weight of nitrogen and 15.80 to 16.20 percent by weight of sulfur and their compositions corresponded to 1:1 copolymers of diallylamine hydrochloride and sulfur dioxide.

The infra-red spectra of these polymers indicated strong absorptions at 1120 cm.$^{-1}$ and 1300 cm.$^{-1}$ due to —$SO_2$— radical but did not indicate absorptions at 1640 cm.$^{-1}$, 990 cm.$^{-1}$ and 940 cm.$^{-1}$ due to double bond. Accordingly it was believed that this polyamine sulfone possessed a structure expressed by a Formula B.

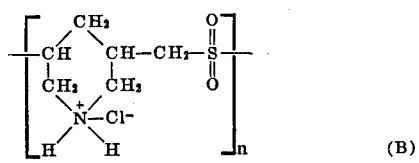

(B)

This polyamine sulfone was white powder having no melting point. When heated, it decomposed at 200° to 220° C. It was slightly soluble in dimethyl sulfoxide and easily soluble in water but if an alkali was added to its aqueous solution, free polyamine sulfone came to precipitate out. This polyamine sulfone (B) was hardly discolored and its aqueous solution could stand in the air for several months without suffering discoloration.

and an aqueous solution containing 12 g. of ammonium nitrate in 20 g. of water was added to the above-mentioned mixture. The polymerization started about 5 minutes later and continued at a temperature of 30° C. for about 12 hours. Resulting polymer was filtered, washed with a 1:9 mixture (by volume ratio) of acetone and methanol and dried. A yield of 560 g. was obtained. Resulting polyamide sulfone was the same material as that obtained in Example 12. An $\eta_{inh}$ as measured in N/10 aqueous solution of sodium chloride at a temperature of 30° C. was 1.12.

*Example 14*

6.4 parts by weight of sulfur dioxide was blown in 100 parts by weight of dimethyl formamide. In this solution, 23.3 parts by weight of N,N-diallylaniline acetate and 0.23 part by weight of ammonium persulfate was dissolved and the polymerization was carried out at a temperature of 30° C. for 20 hours with stirring. A viscous solution obtained by the polymerization was added into a large amount of methanol to precipitate polymer. Resulting polymer was freed of unpolymerized monomer by extracting with methanol and dried at a temperature of 50° C. under a reduced pressure. This polymer was white powder and a yield was 16.5 parts by weight. This polyamine sulfone having 10.58 percent by weight of sulfur and 4.61 percent by weight of nitrogen was soluble in dimethyl formamide and hot water and its $\eta_{inh}$ as measured in dimethyl formamide at a temperature of 30° C. was 0.62.

*Example 15*

22 parts by weight of N-benzyldiallylamine hydrochloride were dissolved in 32 parts by weight of 20 percent methanol solution of sulfur dioxide and while resulting solution was stirred at a temperature of 0° C., 2 parts by weight of 2 percent acetone solution of cumene hydroperoxide were gradually dropped. The polymerization started immediately and white polymer was precipitated. After dropping of catalyst solution, the polymerization was continued with stirring at a temperature of 0°±2° C. for 2 hours. After polymerization, resulting polymer was filtered, washed sufficiently with methanol and dried under a reduced pressure. This polymer was white powder and a yield was about 20 parts. This polymer contained 11.5 percent by weight of sulfur and 5.21 percent by weight of nitrogen. This polyamine sulfone was insoluble in cold water but soluble in dimethyl sulfoxide or hot water. Its $\eta_{inh}$ as measured in dimethyl sulfoxide at a temperature of 30° C. was 0.45.

*Example 16*

11.1 parts by weight of N-methyldiallylamine was added to 50 parts by weight of acetone and while this solution was cooled, 6.0 parts by weight of glacial acetic acid was added. To the acetone solution of N-methyldiallylamine acetate thus obtained, 2 parts by weight of 30 percent cumene solution of cumene hydroperoxide was added and while the mixture maintained at a temperature of 0° C. with stirring 20 parts by weight of 20 percent acetone solution of sulfur dioxide were gradually dropped. The polymerization started immediately and white polymer came to precipitate out. The polymerization was continued at a temperature of 0° C.±2° C. for 3 hours after dropping and the precipitate was filtered, washed with methanol, and dried at a reduced pressure. A yield of 4.6 parts was obtained. This polyamine sulfone had a content of 13.46 percent by weight of sulfur and 5.64 percent by weight of nitrogen. It was believed to be a 1:1 copolymer of N-methyldiallyl amine acetate and sulfur dioxide.

*Example 17*

18 parts by weight of N-β-hydroxyethyldiallylamine hydrochloride were dissolved in 32 parts by weight of 20 percent acetone solution of sulfur dioxide. While this solution was maintained at a temperature of 10° C. with stirring, 3 cc. of 30 percent cumene solution of cumene hydroperoxide was added. The polymerization started immediately and precipitate appeared. The polymerization was continued for another 2 hours after dropping the catalyst. The precipitate was separated by filtration, washed with a 1:9 (by volume) methanol-acetone mixed solution and dried under a reduced pressure. Resulting polymer was white powder. A yield of 16 parts by weight was obtained. This polyamine sulfone contained 13.14 percent of sulfur by weight, 5.65 percent of nitrogen by weight and soluble in water and dimethylsulfoxide. An $\eta_{inh}$ as measured in N/10 aqueous solution of sodium chloride at a temperature of 30° C. was 0.12.

*Example 18*

16.2 parts by weight of dimethallylamine hydrochloride was dissolved in 32 parts by weight of 20 percent methanol solution of sulfur dioxide and the polymerization was carried out by the same method as in Example 15. White powder of polymer was obtained with a yield of about 11 parts by weight. This polyamine sulfone contained 13.64 percent by weight of sulfur, 6.12 percent by weight of nitrogen and had an $\eta_{inh}$ of 0.12 as measured in N/10 aqueous solution of sodium chloride at a temperature of 30° C.

*Example 19*

16 parts by weight of sulfur dioxide were blown in 150 parts by weight of dimethylsulfoxide. 86.8 parts by weight of triallylamine hydrochloride and 1.4 parts by weight of ammonium persulfate were dissolved in this solution. The polymerization was carried out at a temperature of 30° C. for 20 hours. A viscous solution obtained by the polymerization was added to a large amount of methanol to precipitate polymer. Precipitated polymer was washed with methanol and then dried at a temperature of 20° C. under a reduced pressure. A yield of 85 parts by weight of white powdered polymer was obtained. This polyamine sulfone contained 8.42 percent by weight of sulfur, 7.25 percent by weight of nitrogen and was soluble in water or dimethyl sulfoxide.

*Example 20*

86.8 parts by weight of triallylamine hydrochloride and 2.4 parts by weight of ammonium persulfate were dissolved in 150 parts by weight of ethyl alcohol. While this solution was maintained at a temperature of 20° C. with stirring, sulfur dioxide was blown. At about 10 minutes later, the polymerization started and white polymer separated. Blowing was continued until sulfur dioxide was no more absorbed. Thereafter still-standing polymerization was carried out at a temperature of 20° C. for 10 hours. Polymer produced in the polymerization was filtered, washed with a large amount of methanol and dried. White powder of polymer was obtained with a yield of about 82 parts. This polymer contained 9.31 percent by weight of sulfur, 7.02 percent by weight of nitrogen and was insoluble and infusible.

*Example 21*

6.4 parts by weight of sulfur dioxide were blown and dissolved in 50 parts by weight of dimethyl sulfoxide. 32 parts by weight of tetraallyl-ammonium chloride and 0.3 part by weight of ammonium persulfate were dissolved in this solution and the solution was subjected to polymerization. The polymerization started immediately and about 20 minutes later, the entire system gelled. A transparent gelled polymer block obtained was roughly ground, washed with water sufficiently and dried. A yield of 30 parts was obtained. This polymer contained 6.12 parts by weight of sulfur and was insoluble and infusible. This polyamine sulfone is useful as strong basic ion-exchange resins.

*Example 22*

203 parts by weight of diallylmorpholinium chloride were charged in a 5 l. 4-necked flask equipped with a stirrer, a thermometer, a reflux condenser and a dropping funnel and 1500 parts by weight of acetone solution containing 64 parts by weight of sulfur dioxide were added and dissolved therein. While the temperature of this solution at 20° C. to 30° C., 200 parts by weight of 3 percent acetone solution of tert-butyl hydroperoxide were gradually dropped. The polymerization started immediately and white polymer came to precipitate out. The polymerization was continued for about one hour after the end of dropping and resulting polymer was filtered, washed with a 1:9 methanol-acetone (by volume) mixed solution and dried under a reduced pressure. A yield of 250 parts by weight was obtained. This polyamine sulfone contained 12.14 percent by weight of sulfur and 5.14 percent by weight of nitrogen and had an $\eta_{inh}$ of 0.64 as measured in N/10 aqueous solution of sodium chloride at a temperature of 30° C.

*Example 23*

The copolymerization was carried out by the same method as in Example 22 excepting that instead of diallylmorpholinium chloride, 201 parts by weight of diallylpiperidinium chloride were used, whereby 241 parts by weight of white polyamine sulfone containing 12.34 percent by weight of sulfur and 5.21 percent by weight of nitrogen and soluble in water or dimethyl formamide, were obtained. Its $\eta_{inh}$ as measured in N/10 aqueous solution of sodium chloride at a temperature of 30° C. was 0.54.

Example 24

220 parts by weight of N,N,N',N'-tetraallylethylene diamine were neutralized to pH 4 with concentrate hydrochloride acid while cooling. 160 parts by weight of water and then 5 parts by weight of ammonium persulfate were added. While the temperature of the solution maintained at 30° C., about 70 parts by weight of sulfur dioxide was blown in. About 10 minutes later from the start, polymerization started and about 20 minutes later, the whole system gelled. All the sulfur dioxide must be blown in before gelation starts. A transparent gelled polymer block obtained by the polymerization was roughly ground, washed with water and dried. A yield of polymer containing 8.64 percent by weight of sulfur and 3.86 percent by weight of nitrogen, was about 200 parts by weight.

Example 25

11.7 parts by weight of diethyldiallyl ammonium bromide and 0.15 part by weight of ammonium persulfate were added to 32 parts by weight of 10 percent dimethyl sulfoxide solution of sulfur dioxide and the mixture was subjected to 20 hours still standing polymerization at a temperature of 20° C. A gel-liked polymer obtained by the polymerization was washed with a 1:9 (by volume) mixed solution of methanol and acetone and dried. A yield of about 9.2 parts by weight was obtained. This polymer contained 12.01 percent by weight of sulfur and was of slightly yellow color. Its $\eta_{inh}$ as measured in N/10 aqueous solution of sodium chloride was 0.14.

Example 26

A polymerization was carried out by the same method as in Example 25 excepting that 12 parts by weight of diethyldiallyl ammonium iodide were used instead of diethyldiallyl ammonium bromide. During the polymerization parts of iodine were liberated and discolored resulting polyamine sulfone in brown. A yield was also low amounting only 2.8 parts by weight. Compared with corresponding quaternary ammonium chlorides, quaternary ammonium bromide or iodide, had lower copolymerizability with sulfur dioxide and products were frequently colored, hence they were not suitable in practical use.

Example 27

16 parts by weight of sulfur dioxide were blown in 150 parts by weight of dimethyl sulfoxide and were dissolved therein. 66 parts by weight of triallylbenzyl ammonium chloride and one part by weight of ammonium persulfate were dissolved in this solution and the solution was subjected to still-standing polymerization at a temperature of 30° C. for 20 hours. A viscous solution obtained by the polymerization was added into a large amount of methanol to precipitate polymer. Resulting polymer, filtered, washed with methanol and dried contained 11.49 percent by weight of sulfur and 5.02 percent by weight of nitrogen. It was soluble in water and dimethyl sulfoxide but when heated at a temperature of 100° C., it turned insoluble in solvents. This polyamine sulfone decomposed at a temperature from 230° to 250° C.

Example 28

32 parts by weight of sulfur dioxide were blown and dissolved in 250 parts by weight of dimethyl sulfoxide. 34 parts by weight of diallylamine hydrochloride, 47.5 parts by weight of diethyldiallyl ammonium chloride and 2 parts by weight of ammonium persulfate were added and dissolved in this solution. A viscous solution obtained by still-standing polymerization for 20 hours at a temperature of 30° C. was added into acetone to precipitate polymer. Precipitated polymer was washed with a 5.5 (by volume) mixed solution of acetone and methanol and dried at a temperature of 40° C. at a reduced pressure, whereby a yield of 88 parts by weight was obtained. Resulting polymer contained 12.84 percent by weight of sulfur and 6.74 percent of nitrogen. Since this polymer was methanol-soluble, it was not a polyamine sulfone (B) derived from diallylamine hydrochloric acid salt. (Refer to Example 11.) Although this polymer was soluble in water, its aqueous solution produced precipitate by the addition of alkali at pH of 9.1. Hence it was neither a polyamine sulfone derived from diethyldiallyl ammonium chloride. In other words the polyamine sulfone obtained in the present example was believed to be a terpolymer between diallylamine hydrochloride, diethyldiallyl ammonium chloride and sulfur dioxide.

Example 29

175 parts by weight of triallylamine hydrochloride and 325 parts by weight of dimethyldiallyl ammonium chloride were dissolved in 500 parts by weight of water and into this solution 170 parts by weight of sulfur dioxide were blown at a temperature lower than 30° C. and then a solution containing 5 parts by weight of ammonium persulfate in 170 parts by weight of water was added. Polymerization was carried out at a temperature of 30° C. with stirring. This polymerization, accompanied with a violent heat evolution, was continued at a temperature lower than 50° C. for 5 hours. Resulting viscous solution was introduced into methanol to precipitate polymer. Precipitated polymer was washed with methanol and dried at a temperature of 40° C. under a reduced pressure whereby a yield of 520 parts by weight was obtained. This polymer contained 12.86 percent by weight of sulfur and 6.52 percent by weight of nitrogen and was soluble in water or dimethyl sulfoxide. When alkali was added to its aqueous solution, precipitate was formed. This polyamine sulfone was believed to be a terpolymer of triallylamine hydrochloride, dimethyldiallyl ammonium chloride and sulfur dioxide.

What is claimed is:

1. A polyamine sulfone containing at least ⅓ mol of sulfone linkage per amine monomer unit in the molecular chain prepared by radical copolymerization of sulfur dioxide and an unsaturated amine compound having one of the following general Formulas I to IV:

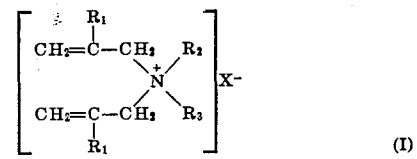

wherein $R_1$ is a hydrogen atom or a methyl radical; $R_2$ and $R_3$ are hydrogen atoms, allyl radicals, methallyl radicals, unbranched or branched alkyl radicals having 1 to 18 carbon atoms, phenyl radicals, benzyl radicals, cyclohexyl radicals, phenethyl radicals, β-hydroxyethyl radicals, β-sulphoethyl radicals, β-carboxyethyl radicals, or carboxymethyl radicals; and X is Cl, Br, I, $HSO_4$, $HSO_3$, HCOO or $CH_3COO$,

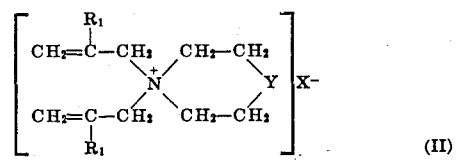

wherein $R_1$ and X are as defined above, and Y is an oxygen atom or methylene radical ($-CH_2-$),

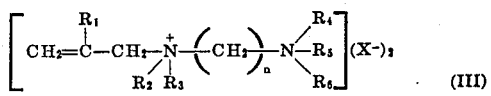

wherein $R_1$ is as defined above; $R_2$, $R_3$, $R_4$, $R_5$ and $R_6$ are hydrogen atoms, allyl radicals, or methallyl radicals, at least one of the $R_2$ to $R_6$ being always an allyl radical or methallyl radical; X is Cl, Br or I and $n$ is from 2 to 6,

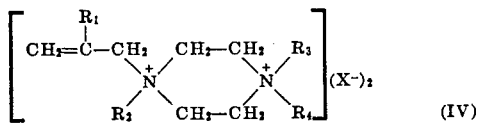

wherein $R_1$ is a hydrogen atom or a methyl radical, $R_2$, $R_3$ and $R_4$ are hydrogen atoms, allyl radicals or methallyl radicals, at least one of the $R_2$, $R_3$ and $R_4$ being an allyl radical or a methallyl radical and X is Cl, Br or I, said polymer being generally a colorless to white amorphous and brittle high molecular weight solid resistant to discoloration upon exposure to air.

2. A process for producing a polyamine sulfone containing at least ⅓ mol of sulfone linkage per unsaturated amine monomer unit in the molecular chain, which comprises copolymerizing sulfur dioxide and an unsaturated amine compound represented by one of the following general Formulas I to IV:

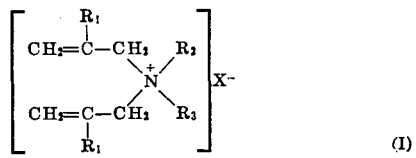

wherein $R_1$ is a hydrogen atom or a methyl radical; $R_2$ and $R_3$ are hydrogen atoms, allyl radicals, methallyl radicals, unbranched or branched alkyl radicals having 1 to 18 carbon atoms, phenyl radicals, benzyl radicals, cyclohexyl radicals, phenethyl radicals, β-hydroxyethyl radicals, β-sulphoethyl radicals, β-carboxyethyl radicals, or carboxymethyl radicals; and X is Cl, Br, I, $HSO_4$, $HSO_3$, HCOO or $CH_3COO$,

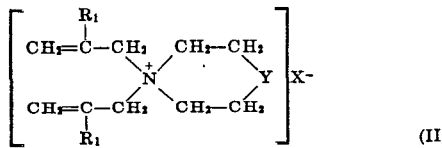

wherein $R_1$ and X are as defined above, and Y is an oxygen atom or methylene radical ($—CH_2—$),

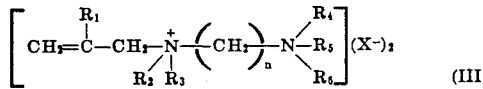

wherein $R_1$ is as defined above; $R_2$, $R_3$, $R_4$, $R_5$ and $R_6$ are hydrogen atoms, allyl radicals, or methallyl radicals, at least one of the $R_2$ to $R_6$ being always an allyl radical or methallyl radical; X is Cl, Br or I and $n$ is from 2 to 6,

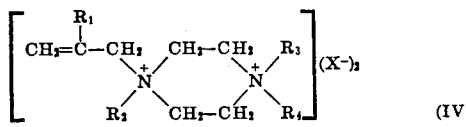

wherein $R_1$ is a hydrogen atom or a methyl radical, $R_2$, $R_3$ and $R_4$ are hydrogen atoms, allyl radicals or methallyl radicals, at least one of the $R_2$, $R_3$ and $R_4$ being an allyl radical or methallyl radical and X is Cl, Br or I, in the presence of a reaction initiator selected from the group consisting of sun light, ultraviolet ray, γ-ray or a catalyst selected from the group consisting of tert.-butylhydroperoxide, di-tert.-butylperoxide, cumene hydroperoxide, ascardiol, α, α'-azobis-isobutylnitrile, ammonium persulfate, potassium persulfate, ammonium nitrate, potassium nitrate, air and oxygen, at a temperature of from $-100°$ C. to $+70°$ C.

3. A method according to claim 2 wherein the reaction is carried out in the presence of a solvent selected from the group consisting of sulfur dioxide, water, methanol, ethanol, propanol, dimethyl sulfoxide, dimethyl sulfone, tetramethylene sulfone, dimethylformamide, dimethylacetamide, acetone and methyl ethyl ketone.

4. A method according to claim 2 in which the unsaturated amine compound is a member selected from the group consisting of dimethyldiallyl ammonium chloride, diethyldiallyl ammonium chloride, dipropyldiallyl ammonium chloride, diallylmorpholinium chloride and diallylpiperidinium chloride.

5. A method according to claim 2 in which the unsaturated amine compound is a member selected from the group consisting of N-methyldiallylamine hydrochloride, N-ethyldiallylamine hydrochloride, N-propyldiallylamine hydrochloride, N-n-butyldiallylamine hydrochloride, N-benzyldiallylamine hydrochloride, N-phenyldiallylamine hydrochloride, N-lauryldiallylamine hydrochloride, and N(β-hydroxy)ethyldiallylamine hydrochloride.

6. A method according to claim 2 in which the unsaturated amine compound is a member selected from the group consisting of triallylamine hydrochloride, trimethallylamine hydrochloride and tetraallylammonium chloride.

7. A method according to claim 2 in which the unsaturated amine compound is a member selected from the group consisting of
hydrochloride of:
N,N or N,N' diallylethylenediamine
N,N' diallylpiperazine
N,N or N,N' diallylhexamethylenediamine
N,N, or N,N' diallylpropylenediamine
N,N,N' triallylethylenediamine
N,N,N' triallylhexamethylenediamine
N,N,N' propylenediamine
N,N,N',N'-tetraallylethylenediamine
N,N,N',N'-hexamethylenediamine
N,N,N',N'-propylenediamine
ammonium chloride of:
N,N-diallylpiperazinium chloride.

8. A method according to claim 2 in which the unsaturated amine is a mixture of at least two unsaturated amine defined in claim 2.

9. A method according to claim 2 in which the radical copolymerization is carried out in the presence of a polymerization medium selected from the group consisting of water, methanol, ethanol, acetone, methylethylketone dimethylformamide, dimethylsulfoxide, dimethylsulfone, tetramethylenesulfone and a mixture thereof.

10. A method according to claim 2 in which the radical copolymerization is carried out in the presence of a polymerization medium of excess of liquid sulfurdioxide.

11. A method according to claim 2 in which the radical copolymerization is carried out under irradiation of a ray.

12. A method according to claim 2 in which the radical copolymerization is carried out in a continuous manner while feeding monomeric amine, sulfur dioxide and withdrawing resulting polymer continuously.

13. A method according to claim 2 in which the unsaturated amine compound is diallylamine hydrochloride.

References Cited

UNITED STATES PATENTS 2,192,467  3/1943  Frey et al. _____ 260—79.3

JOSEPH L. SCHOFER, *Primary Examiner.*

D. K. DENENBERG, *Assistant Examiner.*